United States Patent
Lee et al.

(10) Patent No.: US 12,371,634 B2
(45) Date of Patent: Jul. 29, 2025

(54) METHOD FOR PREPARING BIO-OIL FROM FATTY ACID WITH HIGH ACID VALUE

(71) Applicant: SK ECO PRIME CO., LTD., Ulsan (KR)

(72) Inventors: Mi Ran Lee, Seongnam-si (KR); Hyun Jun Cho, Seongnam-si (KR); Han Seok Kim, Seongnam-si (KR)

(73) Assignee: SK ECO PRIME CO., LTD., Ulsan (KR)

( * ) Notice: Subject to any disclaimer, the term of this patent is extended or adjusted under 35 U.S.C. 154(b) by 502 days.

(21) Appl. No.: 17/794,835

(22) PCT Filed: Jan. 29, 2021

(86) PCT No.: PCT/KR2021/001198
§ 371 (c)(1),
(2) Date: Jul. 22, 2022

(87) PCT Pub. No.: WO2021/154022
PCT Pub. Date: Aug. 5, 2021

(65) Prior Publication Data
US 2023/0100175 A1 Mar. 30, 2023

(30) Foreign Application Priority Data

Jan. 31, 2020 (KR) .......... 10-2020-0012109
Jan. 28, 2021 (KR) .......... 10-2021-0012281

(51) Int. Cl.
*C11C 3/02* (2006.01)
*C10G 3/00* (2006.01)
(Continued)

(52) U.S. Cl.
CPC ............ *C11C 3/02* (2013.01); *C10G 3/00* (2013.01); *C10L 1/02* (2013.01); *C11B 3/12* (2013.01); *C11B 13/02* (2013.01)

(58) Field of Classification Search
CPC .... C11C 3/02; C11C 1/10; C11B 3/12; C10G 3/00
See application file for complete search history.

(56) References Cited

U.S. PATENT DOCUMENTS 5,349,075 A * 9/1994 van den Berg ......... C07C 67/08
554/173
2004/0186307 A1 9/2004 Piacentini et al.
(Continued)

FOREIGN PATENT DOCUMENTS

| CN | 102209702 A | 10/2011 |
| CN | 103013681 A | 4/2013 |

(Continued)

OTHER PUBLICATIONS

KR 102043442 (B1), Seok Ji Hu et al., Method for manufacturing low-valuable glyceride for biodiesel feedstock, 13 pages (Year: 2019).*

(Continued)

*Primary Examiner* — Yate' K Cutliff
(74) *Attorney, Agent, or Firm* — Sughrue Mion, PLLC (57) ABSTRACT

Disclosed is a method for preparing bio-oil, which can be used as bio heavy fuel oil and bio marine oil, from a fatty acid with high acid value. The method for preparing bio-oil comprises the steps of: inputting materials comprising glycerine and a fatty acid into respective material input ports positioned in the center of a column-type reactor and esterification reacting the material comprising glycerine and fatty acid in each tray of a reaction area, thereby producing glyceride and water; obtaining the produced glyceride through a lower part of the reactor; and vaporizing the water produced by the reaction, moving the water (vapor) to a distillation area in an upper part of the reactor to separate the water from active components comprised in the vapor, allowing the separated active components to flow into the (Continued)

reaction area, and removing the separated water (vapor) through the upper part of the reactor.

13 Claims, 3 Drawing Sheets

(51) Int. Cl.
*C10L 1/02* (2006.01)
*C11B 3/12* (2006.01)
*C11B 13/02* (2006.01)

(56) References Cited

U.S. PATENT DOCUMENTS

| | | | |
|---|---|---|---|
| 2005/0075509 | A1 | 4/2005 | Luxem et al. |
| 2007/0161809 | A1 | 7/2007 | Piacentini et al. |
| 2007/0260079 | A1 | 11/2007 | Fleisher |
| 2008/0115407 | A1 | 5/2008 | Hoffman |
| 2009/0050524 | A1 | 2/2009 | Kim et al. |
| 2009/0056201 | A1 | 3/2009 | Morgan |
| 2010/0192453 | A1 | 8/2010 | Pachauri |
| 2010/0228042 | A1 | 9/2010 | Chun et al. |
| 2010/0296997 | A1 | 11/2010 | Parker et al. |
| 2011/0218355 | A1* | 9/2011 | Kim .................. C11C 1/08 422/600 |
| 2012/0094340 | A1 | 4/2012 | Morgan |
| 2014/0005424 | A1 | 1/2014 | Jackam et al. |
| 2014/0039206 | A1 | 2/2014 | Jonsson et al. |
| 2016/0152924 | A1 | 6/2016 | Agarwal |
| 2018/0346831 | A1 | 12/2018 | Sutterlin et al. |
| 2020/0095511 | A1 | 3/2020 | Nie et al. |

FOREIGN PATENT DOCUMENTS

| | | |
|---|---|---|
| CN | 107459997 A | 12/2017 |
| CN | 108277090 A | 7/2018 |
| EP | 0 434 390 A1 | 6/1991 |
| EP | 2 028 260 A1 | 2/2009 |
| EP | 2 348 009 A2 | 7/2011 |
| JP | 58-95549 A | 6/1983 |
| JP | 2003-49192 A | 2/2003 |
| JP | 2009-120847 A | 6/2009 |
| JP | 2009-535442 A | 10/2009 |
| JP | 2012-508282 A | 4/2012 |
| KR | 10-2003-0075216 A | 9/2003 |
| KR | 10-2007-0106236 A | 11/2007 |
| KR | 10-0877004 B1 | 12/2008 |
| KR | 10-2009-0112269 A | 10/2009 |
| KR | 10-2010-0051374 A | 5/2010 |
| KR | 10-1073721 B1 | 10/2011 |
| KR | 10-1265759 B1 | 5/2013 |
| KR | 10-1399207 B1 | 5/2014 |
| KR | 10-2043442 B1 | 11/2019 |
| RU | 2 558 364 C2 | 8/2015 |
| SG | 173459 A1 | 9/2011 |
| SU | 721410 A1 | 3/1980 |
| SU | 1680688 A1 | 9/1991 |
| WO | 03/040268 A1 | 5/2003 |
| WO | 2009/029344 A1 | 3/2009 |
| WO | 2010/097920 A1 | 9/2010 |
| WO | 2014/084938 A1 | 6/2014 |

OTHER PUBLICATIONS

"Petrochemical Structural Engineering Design", edited by Derong Wu: East China University of Science and Technology Press, pp. 148-149, published on Jan. 31, 2018 (7 pages total).

International Search Report for PCT/KR2021/001198 dated May 4, 2021.

* cited by examiner

METHOD FOR PREPARING BIO-OIL FROM FATTY ACID WITH HIGH ACID VALUE

CROSS REFERENCE TO RELATED APPLICATIONS

This application is a National Stage of International Application No. PCT/KR2021/001198 filed Jan. 29, 2021, claiming priority based on Korean Patent Application No. 10-2020-0012109 filed Jan. 31, 2020 and Korean Patent Application No. 10-2021-0012281 filed Jan. 28, 2021, the entire disclosures of which are incorporated herein by reference.

TECHNICAL FIELD

The present disclosure relates to a method for producing bio-oil from fat and oil with high acid values and, more specifically, to a method for producing bio-oil usable as bio heavy oil and bio-marine fuel oil from fat and oil with high acid values.

BACKGROUND

In Korea, the main project of bio-heavy oil for power generation has recently begun, and the demand for bio-heavy oil is steadily increasing. In addition, due to the influence of IMO (International Maritime Organization) 2020, the demand for low sulfur fuel oil for use in ships is expected to increase explosively, with increasing attention paid to bio-marine fuel oil as a low sulfur oil.

Bio-heavy oil for power generation is prepared using bio-based fat and oil resources, such as animal and vegetable oils and biodiesel process by-products, etc., as raw materials, and is an alternative fuel to heavy oil (bunker-C oil). Currently, bio-heavy oil is used as a heavy oil generator fuel for power generators. A pilot project of bio-heavy oil was launched in 2014, and after the feasibility evaluation, the main project began in 2019.

IMO 2020 is an annex of the International Convention for the Prevention of Pollution from Ships (MARPOL) adopted by the International Marine Organization (IMO). On Jan. 1, 2020, a new limit on the sulphur environment (content) in the fuel oil used on board ships came into force. In detail, the sulphur cap in marine fuel oil is reduced to 0.5% from 3.5%. Accordingly, the demand for the use of low-sulfur marine fuel oil as one of the measures to reduce sulphur oxide emissions is increasing. In this regard, bio-oil basically has a low sulfur content and as such, when burned in an internal combustion engine, generates less sulfur oxide than conventional coal-derived oil.

Bio-heavy oil or bio-marine fuel oil should be manufactured to be below a certain level of acid value because a high acid value can cause corrosion of internal devices and facilities. For this reason, raw materials for bio-heavy oil or bio-marine fuel oil should be low in acid value, and raw materials with high acid values can be used only after taking a measure to lower the acid values.

Various methods are known to lower high acid values of fats and oils. Methods for removing free fatty acids to lower acid values of fat and oil in a general oil refining process includes removal of free fatty acids through neutralization with an alkaline aqueous solution and removal through free fatty acids through distillation. However, the higher the acid value, the greater the amount of free fatty acids to be removed, making the removal of free fatty acids less economical. The method of neutralizing with an aqueous alkali solution has the problem in that a large amount of wastewater is generated. In order to use free fatty acids contained in high acid value oil and fat without removal, a method for converting free fatty acids into bio-oil is proposed.

A method for production bio-oil without removing free fatty acids from fat and oil with high acid values may be exemplified by reacting fatty acid with glycerin to produce bio-oil (glyceride). Here, the term glyceride is intended to encompass all mono-, di-, and triglycerides.

The production of bio-oil through reaction of fatty acid with glycerin is known as one of pre-treatment methods of using fatty acid-rich oil (fat and oil with high acid values) as a bio-diesel (FAME) material. Typically, bio-diesel (FAME) is produced by trans-esterification between bio-oil (glyceride) and methanol (MeOH). When the raw material has a high content of fatty acids, the fatty acids cannot participate in the trans-esterification, resulting in a decrease in yield because the fatty acids react with alkaline ingredients derived from the reaction catalyst to give an increased amount of saponification ingredients (soap).

Proposed as a solution to the problem is a production method for the bio-diesel fatty acid alkyl ester (trans-esterification) in which fatty acid and glycerin is primarily reacted in a pretreatment process to give glyceride which is then secondarily reacted with methanol in the presence of a base catalyst, as illustrated in the following Reaction Scheme 1:

[Reaction Scheme 1]

In order to increase the reactivity of the conversion process of fatty acid to bio-oil (glyceride), a catalyst is employed or the reaction product water is continuously removed during the reaction process.

U.S. patent application Ser. No. 13/924,235 discloses that the reaction is conducted in the presence of a solid catalyst. The reaction using the catalyst suffers from high production cost not only because the catalyst is expensive, but also because the lifespan of the catalyst becomes short as it is poisoned with impurities or carbon deposits. In addition, the water is removed in the form of vapor to induce a smooth reaction.

Figure 1:
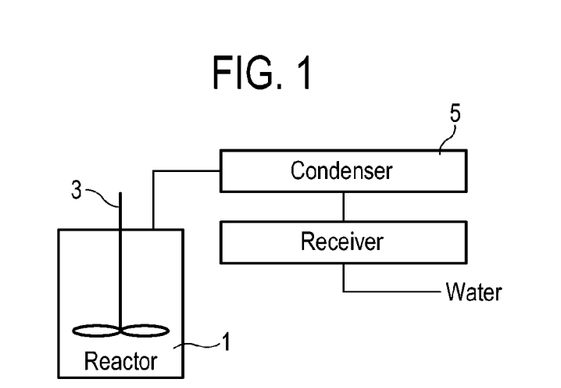
FIG. 1 is a configurational scheme of a batch-type reactor conventionally used for production of bio-oil.

FIG. 1 is a configurational scheme of a batch reactor conventionally used for production of bio-oil. As shown in FIG. 1, one reactor (1) is equipped with one stirrer (3). Although reactants and products are neither fed nor drawn during the reaction therein, the batch reactor is structured to continuously remove the byproduct water produced due to esterification through a condenser (5).

Chinese Patent application Numbers CN 2012-10580909, and CN 2018-10088660 suggest a method in which a catalyst-free reaction is conducted in a slight vacuum/reduced pressure condition or under a nitrogen flow in an atmospheric pressure condition, with the water being well removed. Korean Patent Number 10-1073721 discloses a method in which the reaction is conducted in the presence of a catalyst in a slight vacuum/reduced pressure condition or under a nitrogen flow in an atmospheric pressure condition with the byproduct water being removed. As such, a batch reactor needs a device for readily removing the byproduct water so as to increase the reactivity. A batch reaction process requires a time for feeding raw materials, releasing the product, elevating the temperature, etc., suffering from the problem of lower output, higher production cost, and more operating manpower than continuous reaction processes.

Figure 2:
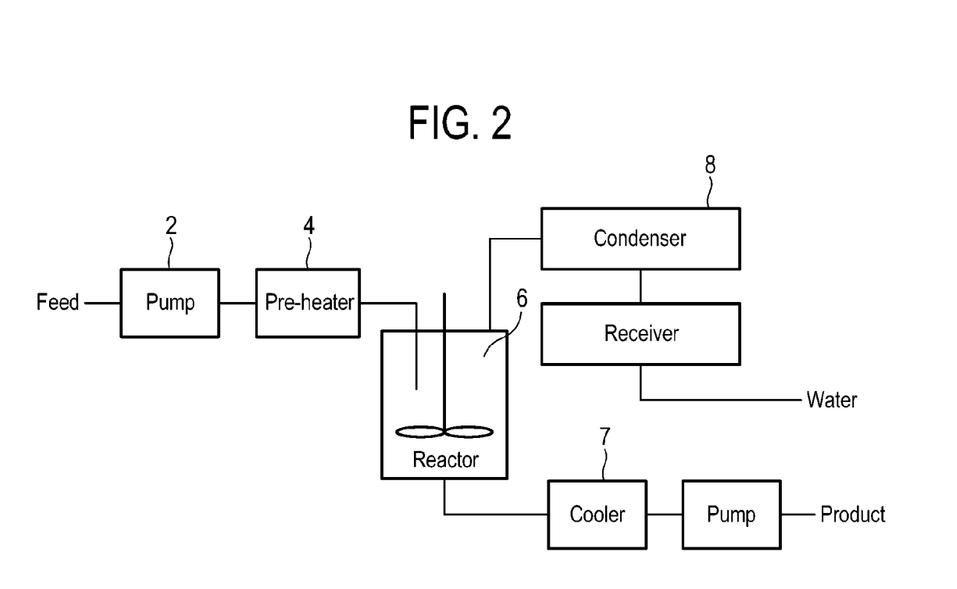
FIG. 2 is a schematic view of a continuous stirred tank reactor (CSTR) conventionally used for production of bio-oil.

A continuous reaction process is proposed to solve the problem with batch reaction processes and to increase output and process yield. FIG. 2 is a schematic view of a continuous stirred tank reactor (CSTR). As shown in FIG. 2, a raw material is fed by a pump (2) into a reactor (6) while being heated by a heating device (4). The product generated in the reactor (6) is released from the lower part of the reactor while being cooled by a cooler (7). In addition, the by-product water formed through the esterification is distilled toward the top of the reactor and can be removed by a condenser (8).

Since a CSTR has difficulty in implementing the first-in, first out of reactants, the reaction goal is difficult to achieve with only one reactor unit. To compensate for this, some patents disclose continuous reactions in many connected reactor units. To reach a target reaction level, Chinese Patent application Number CN 2017-10598802 discloses a method in which reactions are conducted in four kettle-type reactor units connected in series and U.S. patent application Ser. No. 13/924,235 discloses that continuous reactions are conducted in two CSTR units connected to each other. As such, when connected to each other, many CSRT units make it possible to conduct continuous reactions at higher reactivity, compared to single CSTR units.

However, the suggested batch reactors and CSTR lose reactants and products together with the released water when the byproduct water is removed in the form of vapor.

According to U.S. patent application Ser. No. 13/924,235, water is removed in the form of vapor to smoothly conduct the reaction. However, since the vapor stream contains water, a feed stock, and glycerin, a loss occurs even in view of yield. Thus, the feed stock and glycerin must be separated from the vapor stream removed.

According to Korean Patent Number 10-1073721, when 583.9 g of soap stock was reacted, 654.68 g of glyceride was recovered and a total of distillation amounts to 58.58 g with about 3.5 ml of low-molecular weight fatty acids contained therein. This indicates that fatty acids were lost as a vapor in an amount of about 0.5% by weight relative to the product, amounting to the about 5.5% by weight of a total of distillation.

Unlike a column-type reactor, a stirring-type reactor (batch-type reactor, CSTR reactor) is structured to be unable to recover the reactant and product released in a vapor form together with water during the removal of the byproduct water, with the resultant loss of main materials during the reaction process. Due to lack of the ability to effectively remove water without loss of the reactant and product, the reactor is not free from moisture content in raw materials. In addition, a stirring-type reactor cannot perfectly conduct a first-in first out process so that the feed stock cannot participate in the reaction, but excreted. In contrast, a column-type reactor makes it possible to conduct a first-in first-out process, so that even a single reactor can guarantee sufficient reactivity.

RELATED ART DOCUMENT (Patent Literature 1) U.S. patent application Ser. No. 13/924, 235
(Patent Literature 2) Korean Patent Number 10-1073721

SUMMARY

Some embodiments of the present disclosure provide a method for continuously producing bio-oil (glyceride) by reacting fatty acid with glycerin without using a catalyst.

Other embodiments of the present disclosure provide a method for producing bio-oil, wherein a column-type reactor is employed to effectively remove the byproduct water and to make purification of the raw material glycerin unnecessary, whereby glycerin can be used as a feedstock irrespective of the moisture content therein and the reaction yield can be increased, with the resultant economical production of bio-oil.

Provided according to the present disclosure in some embodiments is a method for producing bio-oil, the method including the steps of: esterifying a feedstock containing glycerin and fatty acid to afford bio-oil and water in a column-type reactor which has a plurality of trays installed therein to form a plurality of compartments in the vertical direction inside the reactor, the plurality of trays each having an opening formed therein through which vertically adjacent compartments communicate with each other, with the openings in adjacent trays alternately formed in a crisscrossing manner, the feedstock containing glycerin and fatty acid being fed through respective material input ports located at the center of the column-type reactor to conduct the esterification in each tray of a reaction zone; obtaining the produced bio-oil through a lower part of the reactor; and removing the water produced through the esterification by vaporizing the water, moving the resulting water vapor to a distillation zone in an upper part of the reactor, along with the effective ingredients including the feedstock and the bio-oil which are converted into vapor upon the vaporization, separating the vapor into water and the effective ingredients including feedstock and bio-oil, and allowing the effective ingredients to flow into the reaction zone and the separated water to be removed in a vapor state through the upper part of the reactor, wherein the bio-oil has an acid value of 30 mgKOH/g or lower, and the esterification reaction is performed at a reaction temperature of 170 to 350° C. under atmospheric pressure without using a catalyst.

The method for producing bio-oil from fat and oil with a high acid value according to an embodiment of the present disclosure is adapted to produce bio-oil (glyceride) in a continuous manner by reacting fatty acid and glycerin without using any catalyst in a column-type reactor which is structured to effectively remove the byproduct water, making purification of the raw material glycerin unnecessary, whereby glycerin can be used as a feedstock irrespective of the moisture content therein and the reaction yield can be increased, with the resultant economical production of bio-oil.

DETAILED DESCRIPTION

Embodiments of the present disclosure are illustrated for describing the technical scope of the present disclosure. The scope of the claims according to the present disclosure is not limited to the embodiments described below or to the detailed descriptions of these embodiments.

All technical or scientific terms used herein have meanings that are generally understood by a person having ordinary knowledge in the art to which the present disclosure pertains, unless otherwise specified. The terms used herein are selected for only more clear illustration of the present disclosure, and are not intended to limit the scope of claims in accordance with the present disclosure.

The expressions "include", "provided with", "have" and the like used herein should be understood as open-ended terms connoting the possibility of inclusion of other embodiments, unless otherwise mentioned in a phrase or sentence including the expressions.

In understanding the scope of the present disclosure, the term "consisting of" and its derivatives, as used herein, are intended to be close-ended terms that specify the presence of stated features, elements, components, groups, integers, and/or steps, and also exclude the presence of other unstated features, elements, components, groups, integers and/or steps.

A singular expression can include meanings of plurality, unless otherwise mentioned, and the same is applied to a singular expression stated in the claims.

As used herein, the term "about" is intended to include an acceptable error range in view of manufacturing process for a particular value or a slight numerical modification to the particular value within the scope of the technical scope of the present disclosure. For instance, the term "about" means a range of ±10% of a given value, ±5% of a given value in an aspect, and ±2% of a given value in another aspect. For the field of this disclosure, this level of approximation is appropriate unless the value is specifically stated require a tighter range.

Below, a detailed description will be given of the present disclosure in conjunction with the accompanying drawings.

Figure 3:
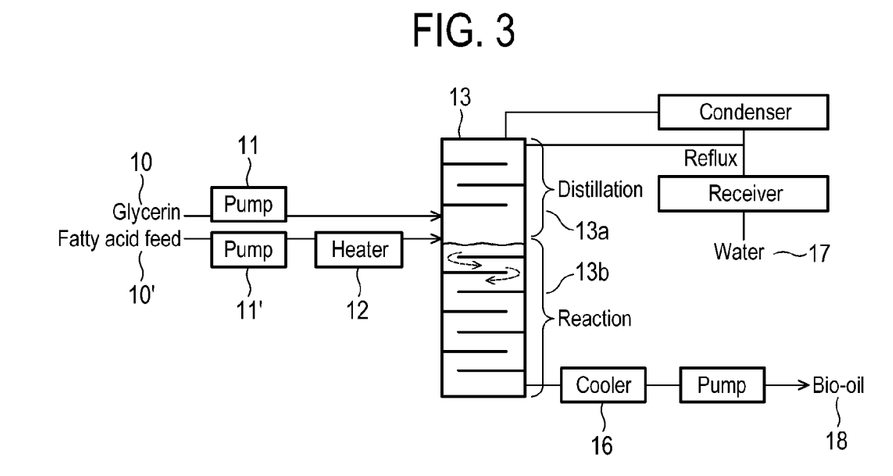
FIG. 3 is an overall configurational scheme of a column-type reactor used for production of bio-oil according to an embodiment of the present disclosure.

FIG. 3 is an overall configurational scheme of a production apparatus used in a method for producing bio-oil according to an embodiment of the present disclosure. As shown in FIG. 3, the reaction apparatus used in the present disclosure is a column-type reactor which has a plurality of trays installed therein to form a plurality of compartments in the vertical direction inside the reactor. The plurality of trays have respective openings formed therein through which vertically adjacent trays communicate with each other therethrough. The openings in adjacent trays are alternately positioned in a crisscrossing manner. A method for producing bio-oil according to the present disclosure includes the steps of: esterifying a feedstock (10') (hereinafter referred simply to as fatty acid, as necessary) containing glycerin (10) and fatty acid to afford bio-oil (glyceride) and water by feeding the feedstock into the column-type reactor through respective material input ports located at the center of the column-type reactor to conduct the esterification in each tray of a reaction zone (13b) positioned below the material input ports; obtaining the produced bio-oil (glyceride) through a lower part of the reactor; and removing the water produced through the esterification by vaporizing the water, moving the resulting water vapor to a distillation zone in an upper part of the reactor, along with the effective ingredients including the feedstock and the bio-oil which are converted into vapor upon the vaporization, separating the vapor into water and the effective ingredients (feedstock and bio-oil), allowing the effective ingredients to flow into the reaction zone and the separated water to be removed in a vapor state through the upper part of the reactor. The bio-oil (glyceride) is produced by conducting esterification at a reaction temperature of 170 to 350° C. for 2 hours or longer under atmospheric pressure without using a catalyst and may have an acid value of 30 mgKOH/g or lower.

In the present disclosure, the glycerin (10) includes purified glycerin and crude glycerin. In detail, the glycerin may have a concentration of 3 to 100% by mass and particularly 5 to 99% by mass and, in greater detail, may include a crude glycerin ranging in concentration from 5 to 85% by mass and a purified glycerin ranging in concentration from 99 to 100% by mass. In addition, the crude glycerin generated in traditional fatty acid production processes or bio-diesel production processes may be readily used without further concentration and a liquid state may be preferred.

In some particular embodiments, the feedstock (10') including fatty acid may range in fatty acid content from 15 to 100% by weight and preferably from 20 to 97% by weight.

In detail, the feedstock including fatty acid contains acid oil prepared by processing a soap stock. The soap stock is a soap substance resulting from the reaction of free fatty acid with an alkali added in the purification of vegetable oil. Soap stock is treated with sulfuric acid to afford acid oil.

The feedstock including fatty acid is intended to encompass a fatty acid-containing feed among products or byproducts (e.g., fatty acid pitch) generated in a process for oleochemicals. The term "oleochemicals" refer to vegetable and animal oils and fats or chemicals derived therefrom. The feedstock including fatty acid may be a product or byproduct generated upon the production of oleochemicals and may preferably range in fatty acid content from 15 to 100% by weight.

In addition, the feedstock including fatty acid may further contain an oil including fatty acid as a result of oil expression and purification of vegetable/animal oils and fats (e.g., palm sludge oil, palm oil mill effluent, palm fatty acid distillate, etc.), recoverable oil (e.g., waste cooking oil, brown grease, etc.), and may be preferably vegetable and animal oil and fat with a fatty acid content of 15 to 100% by weight.

Before entering the reactor, the feedstock including fatty acid may be fed in a heated state by a heater (12). In this regard, the temperature of the heater (12) may be 100 to 250° C. and preferably 150 to 250° C. The fatty acid may have an acid value greater than 30 mgKOH/g (high acid value) and may be preferably used in a liquid state. After being fed, the heated feedstock can uniformly maintain the internal temperature of the reactor. The fatty acid may be heated before being fed because the input thereof is greater than that of the glycerin.

A mixing ratio (molar ratio) of the feedstock including fatty acid to glycerin refers to a molar ratio of the fatty acid contained in the feedstock to glycerin and may range from 3:0.5 to 3:2 and preferably from 3:0.75 to 3:1. An amount of glycerin less than the lower limit of the mixing ratio (molar ratio) range cannot achieve the desired acid value. When the amount of glycerin exceeds the upper limit of the mixing ratio (molar ratio) range, abundant glycerin remains unreacted in the final product. Particularly, when an excess of glycerin is fed, the produced bio-oil (glyceride) and glycerin are separated to different layers, necessitating an additional process of separating glycerin.

By the method for producing bio-oil according to the present disclosure, oil and fat with a high acid value can be used to obtain bio-oil low in acid value. As used herein, the term "oil and fat with a high acid value" refers to oil and fat having an acid value of more than 30 mgKOH/g, more than 40 mgKOH/g, more than 50 mgKOH/g, more than 60 mgKOH/g, more than 70 mgKOH/g, more than 80 mgKOH/g, more than 90 mgKOH/g, more than 100 mgKOH/g, more than 110 mgKOH/g, more than 120 mgKOH/g, or more than 130 mgKOH/g, or particularly oil and fat having an acid value of more than 150 mgKOH/g, or 180 mgKOH/g.

According to an exemplary embodiment of the present disclosure, palm acid oil (PAO) with an acid value of 139 mgKOH/g or palm fatty acid distillate (PFAD) with an acid value of 189 mgKOH/g was used in the bio-oil production method of the present disclosure to obtain bio-oil with an acid value of as low as 22 mgKOH/g or 26.2 mgKOH/g according to retention time in the reactor.

Hereinafter, reaction (production) conditions for bio-oil (glyceride) will be elucidated in detail. Prior to conducting a continuous reaction in a column-type reactor, a reaction condition was set forth for a batch reaction, which is effective for optimizing reaction conditions. In detail, since the esterification according to the present disclosure is conducted at a high temperature range, a high reaction rate and a high conversion rate of fatty acid can be obtained. The esterification is conducted at 170 to 350° C. and preferably at 200 to 250° C. and at the atmospheric pressure. Even in a non-vacuum condition, a high reaction rate and a high conversion rate are obtained. At a temperature beyond the upper and lower limits of the reaction temperature range, the reaction rate and the conversion efficiency of fatty acid are lowered or the water generated by esterification between fatty acid and glycerin is not readily removed, which may provoke a reverse reaction.

The present disclosure is preferably proceeded without any catalyst. In the presence of a catalyst, the reactivity may be further improved. However, even when no catalysts are employed, the byproduct water can be effectively removed to sufficiently increase the reactivity. For a catalytic reaction, the catalyst is difficult to reuse and is expensive, thereby increasing the production cost. Moreover, a process of removing the catalyst (e.g., filtration process) is additionally needed. That is to say, the absence of a catalyst leads to no processes of removing the catalyst, thus decreasing the production cost and economically producing bio-oil. In addition, the reaction is carried out for 2 hours or longer or 2 hours 15 minutes or longer and is considered to be completed within about 6 hours. Therefore, the reaction time according to the present disclosure may 2 to 6 hours.

In order to easily remove the byproduct water of the esterification of fatty acid, the conversion rate has been conventionally increased by establishing a vacuum/reduced pressure condition or by flowing nitrogen. Fulfillment in such a condition requires establishment of facility for vacuum/reduced pressure operation or nitrogen injection. However, since the reaction is conducted at as high as 170 to 350° C. and preferably at 200 to 250° C. under atmospheric pressure in the present disclosure, the water generated by the reaction is continuously removed from the reaction system without an additional facility. Therefore, the esterification according to the present disclosure exhibits an excellent reaction conversion rate close to a perfect reaction beyond the reaction equilibrium even without using an additional facility.

The bio-oil (18) obtained in the present disclosure includes mono-, di-, triglyceride, or a mixture thereof. The acid value of the bio-oil (glyceride), although differing according to goals of the product, may be 30 mgKOH/g or less and preferably 25 mgKOH/g or less.

Figure 4:
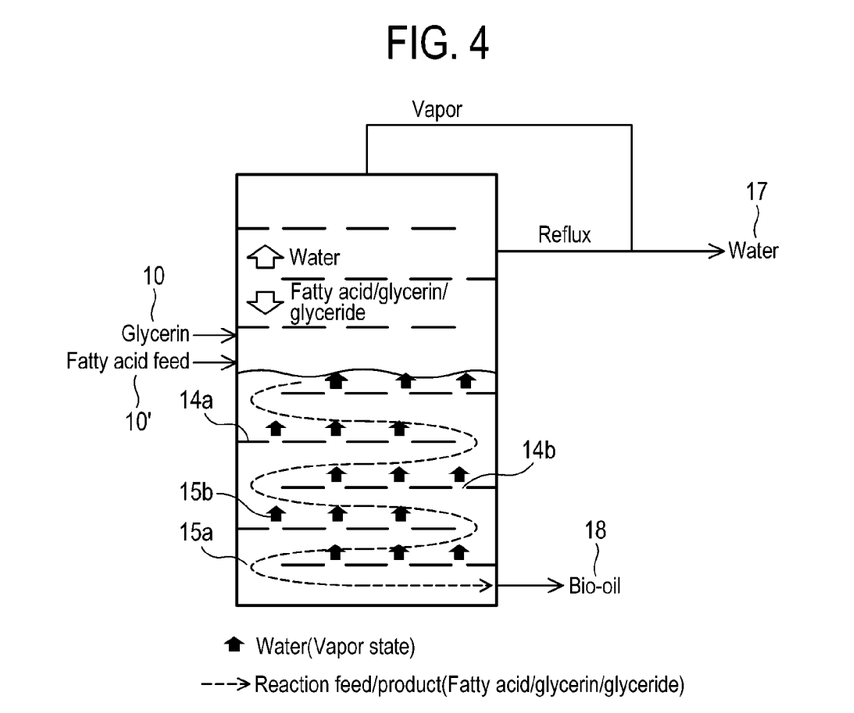
FIG. 4 is a schematic view of a detail of the column-type reactor according to an embodiment of the present disclosure.

FIG. 4 is a schematic view of a detail of the column-type reactor for production of bio-oil according to the present disclosure. As shown in FIG. 4, the esterification reactor used in the present disclosure is a column-type reactor that operates in an atmospheric pressure condition. In the column-type reactor, a plurality of trays (14a) is installed to form a plurality of compartments in the vertical direction, wherein the plurality of trays each have an opening formed therein through which vertically adjacent compartments communicate with each other, with the openings in adjacent trays alternately formed in a crisscrossing manner, so as to allow the reactants to sequentially pass through all of the plurality of compartments.

Inside the column-type reactor, spaces above and below a site where to inject the feedstock are named an upper part (13a) and a lower part (13b), respectively, and the upper part is responsible for a distillation zone and the lower part for a reaction zone. The reaction zone is a full liquid type space fully filled with the liquid-phase feedstock and the product bio-oil. In such a column-type reactor, glycerin and fatty acid are fed through respective input ports located at a middle region of the reactor and flow down to the lower part to sequentially pass through different trays (14a) in the reaction zone (13b) while continuously undergoing esterification, whereby the short pass of the reactants can be prevented and a first-in first-out procedure can be made to secure a sufficient reaction time.

In each tray of the reaction zone, glycerin is esterified with fatty acid to afford bio-oil (glyceride) and water. The water (17) produced as the byproduct is vaporized at the high reaction temperature and moves in a vapor state through a vapor path (14b) formed in each tray, such as a hole, a valve, or a bubble cap, to the distillation zone (13b) in the upper part of the column-type reactor. As the water vaporizes and moves toward the distillation zone, which is the upper part of the reactor, the effective ingredients including the feedstock and the bio-oil ascend together. Thus, the water to be removed and the effective ingredients (feedstock and bio-oil) to be maintained coexist in the vapor moving toward the upper part of the reactor.

The distillation zone in the upper part of the reactor has the same structure as in the distillation column composed of trays used for general chemical processes. While undergoing gas-liquid contact on each tray in the distillation zone, the vapor escaping from the reaction zone is separated into the feedstock and bio-oil in a liquid phase due to their high boiling point and water in a gas phase due to its low boiling point. The separated feedstock and bio-oil flow down along the trays to the reaction zone in the lower part of the reactor while the water is released in a vapor form from the top of the reactor. In this regard, the water released in a vapor form from the top of the reactor is cooled in a condenser. Some of the water is returned partially back to the reactor under reflux and the remaining is removed. The water and a trace amount of the effective ingredients cooled in the condenser are subjected to reflux to increase the separation efficiency of water and effective ingredients (feedstock and bio-oil) in the distillation zone.

In the reaction condition for esterification, the water resulting from the reaction is removed in a vapor form and only the produced bio-oil flows down along the column trays to the lower part of the reactor. Thus, almost no water exists on the trays in the lower part (13b) of the column-type reactor, enabling the reaction to be completed without any reverse reaction. The effective ingredients that may lose as the vapor generated during the reaction is returned from the distillation zone to the reaction zone of the reactor, whereby the loss of effective ingredient can be minimized.

Inside the column-type reactor, a plurality of trays is installed, each tray (14a) including a plurality of vapor paths (14b). According to types of the tray, various forms such as bubble caps, sieves, valves, etc. may be applied to the vapor paths.

In the present disclosure, the bio-oil produced by esterification between glycerin (10) and fatty acid (10') is released, together with the unreacted raw materials glycerin (10) and fatty acid (10'), from the lower part of the reactor (15a). In detail, the product bio-oil (glyceride, 18) and the unreacted materials glycerin and fatty acid are cooled by a cooler (16) before being attained. In addition, each tray acts as a hurdle interrupting the short pass of the unreacted glycerin (10) and fatty acid (10') and allows for the first-in first-out of the feedstock, thereby guaranteeing a sufficient retention time and improving the conversion rate. These advantages may lead to the establishment of an optimal condition for producing bio-oil with a low acid value.

In the reaction zone, the flow rate is determined to secure a retention time of 2 to 6 hours necessary for the reaction.

The employment of such a column-type reactor allows for the production of bio-oil (glyceride) having as low an acid value as desirable even in a single-step esterification between fatty acid and glycerin.

Moreover, the feedstock including fatty acid and glycerin and the product bio-oil (glyceride) that escape in the vapor form, together with water, from the reactor and thus are lost can be quantitatively minimized. Only water can be effectively removed. Being structured to effectively remove water only, the reactor can use the feedstock without limitations irrespective of the water content therein. The bio-oil (glyceride) thus produced can be used as bio-heavy oil and as an alternative to bunker-C oil such as marine fuel oil, industrial oil, etc.

In an exemplary embodiment of the present disclosure, the continuous, column-type reactor of the present disclosure was found to decrease in the loss rate of glyceride and fatty acid and produce bio-oil with lower acid values even though proceeding the reaction at lower temperatures, compared to conventional CSTR reactors (Test Example 15).

Hereinafter, a better understanding of the present disclosure may be obtained through the following Examples and Comparative Examples, which are set forth to illustrate, but are not to be construed to limit, the present disclosure.

Analysis Method (1) Acid values (mgKOH/g) were measured as per KSM ISO 6618~indicator titration.
(2) Moisture was analyzed using Karl-fisher.
(3) The concentration of glycerin in the water generated during the reaction was determined as per KSM 2708-6.7.
(4) The contents of glycerin and oil were quantitatively analyzed using the calibration curves that were established for internal standards according to KSM 2412 with a modification made thereto. The internal standards include butanetriol for glycerin and tricaprin for mono-, di-, and triglyceride. Using the internal standards, contents of glycerin, monoglyceride (olein, palmitin), diglyceride, and triglyceride were measured (Oil content=sum of mono-, di-, triglyceride).
(5) Fatty acid was analyzed by GC (Internal standard: C17 acid).

Reaction Material

Feedstock Containing Fatty Acid:
(1) Palm Sludge Oil or Palm Oil Mill Effluent (POME), also known as palm acid oil (PAO), which is palm oil recovered through layer separation of water generated during the oil expression from palm fruits.
(2) Palm Fatty Acid Distillate (PFAD), which is a byproduct generated in palm oil production process.

Purified glycerin: reagent-grade glycerin with a purity of 99% or higher.

Crude glycerin: glycerin with low purity, generated in oleochemical processes (bio-diesel, fatty acid production processes).

[TEST EXAMPLES 1 to 4] Production of Bio-Oil According to Reaction Temperature (Batch Type)

In an experiment for establishing operation conditions for a batch-type reaction, fatty acid (PAO) and glycerin (purified or crude glycerin) were used as feeds. Together with acid values of the fatty acid (PAO), contents of oil (glyceride), moisture, and fatty acid are summarized in Table 1, below. Various glycerins with purity ranging from 9 to 99% by weight were used. Use was made of purified glycerin in Test Example 1 and crude glycerin in Test Examples 2 to 4. Contents of glycerin used in the reaction are listed in Table 1, below.

Together with 200 g of the feed (PAO) containing fatty acid, glycerin was fed in an amount accounting for a molar ratio of 3:2 of fatty acid:glycerin into the reactor. The temperature of the reactor was elevated to up to 170-250° C. From the time point at which the reaction temperature was achieved, the reaction time was counted. The byproduct water (vapor state) in the upper part of the reactor was cooled and removed continuously. The acid values of the bio-oil (glyceride) finally obtained at predetermined reaction temperatures are listed in Table 1, below.

TABLE 1

|  | Temp. [° C.] | Feed CGL glycerin Content | Rxn. Time | Final Acid Value [mgKOH/g] |
|---|---|---|---|---|
| PAO | — | — | — | 154.7 |
| Test Ex. 1 | 250 | 99% or more | 2 hr | 1.71 |
| Test Ex. 2 | 250 | 35% | 2 hr | 5.26 |
| Test Ex. 3 | 200 | 9% | 2 hr | 30.0 |
| Test Ex. 4 | 170 | 35% | 2 hr | 73.4 |

As shown in Table 1, the acid value was decreased as the fatty acid was converted into glycerides at 170 to 250° C. in Test Examples 1 to 4. Particularly in Test Examples 1 to 3, the reaction temperature of 200 to 250° C. improved the reactivity, resulting in acid values of 30 mgKOH/g or less following the reaction. In contrast, the final acid value of Test Example 4 did not meet the requirement of the present disclosure.

[TEST EXAMPLES 5 to 9] Production of Bio-Oil According to Reaction Time (Batch Type)

Fatty acid (PAO) and crude glycerin with a purity of 8.8% by weight were used as feeds. Acid values of the fatty acid (PAO) and contents of oil (glyceride), moisture, and fatty acid are summarized in Table 2, below.

Together with 200 g of the fatty acid feed (PAO), crude glycerin (9% by weight) was fed in an amount accounting for a molar ratio of 3:2 of fatty acid:glycerin into the reactor. The temperature of the reactor was elevated to up to 200° C. After the reaction temperature was achieved, samples were taken and analyzed by time. The byproduct water (vapor state) in the upper part of the reactor was cooled and removed continuously. The acid values of the bio-oil (glyceride) finally obtained at predetermined reaction time are listed, along with contents of the products, in Table 2, below.

TABLE 2

|  | Rxn. Time | Final Acid Value [mgKOH/g] | Glycerin [wt %] | Oil [wt %] | Water [wt %] | FFA [wt %] |
|---|---|---|---|---|---|---|
| PAO | — | 154.7 | 0 | 23.02 | 1.402 | 75.03 |
| Test Ex. 5 | 0 hr | 141.2 | 1.4 | 35.46 | — | 68.46 |
| Test Ex. 6 | 1 hr | 86.5 | 3.34 | 56.5 | 0.567 | 41.95 |
| Test Ex. 7 | 1 hr 45 min | 47.6 | 4.61 | 71.48 | 0.444 | 23.08 |
| Test Ex. 8 | 2 hr 15 min | 30.0 | 5.15 | 79.76 | 0.45 | 14.53 |
| Test Ex. 9 | 2 hr 30 min | 21.8 | 5.31 | 84.13 | 0.28 | 10.59 |

As shown in Table 2, the acid value rapidly decreased at a reaction temperature of 200° C. after the reaction time of up to 1 hours 45 min. in Test Example 5 to 7, but could not reach 30 mgKOH/g. In contrast the acid value reached 30 mgKOH/g after the reaction time of 2 hours 15 min in Test Example 8 and further decreased to 21.8 mgKOH/g after 2 hours 30 min in Test Example 9. Thus, the reaction time was observed to need two hours or longer.

[TEST EXAMPLES 10 to 14] Production of Bio-Oil According to Mixing Ratio (Molar Ratio) of Fatty Acid and Glycerin (Batch Type)

Fatty acid (PAO) and crude glycerin with a purity of 35% by weight were used as feeds. Acid values of the fatty acid (PAO) and contents of oil (glyceride), moisture, and fatty acid are summarized in Table 3, below. Together with 200 g of PAO, the crude glycerin was fed into the reactor. In this regard, the amount of the reaction feed crude glycerin was determined according to the molar ratios listed in Table 3, below.

The reaction temperature was set to be 250° C., but 200° C. for Test Example 11. After the reactor was heated to the reaction temperatures set forth, reaction time was counted.

TABLE 3

|  | FFA:Glycerin Molar Ratio | Temp. [° C.] | Rxn. Time [hr] | Final Acid Value [mgKOH/g] | Glycerin [wt %] | Oil [wt %] | Moisture [wt % t] | FFA [wt %] |
|---|---|---|---|---|---|---|---|---|
|  | PAO |  | — | 154.7 | 0 | 23.02 | 1.402 | 75.0 |
| Test Ex. 10 | 3:2 | 250 | 2.5 | 2.82 | 4.03 | 88.31 | 0.26 | 1.4 |
| Test Ex. 11 | 3:1.5 | 200 | 3.5 | 10.64 | 3.16 | 89.58 | 0.396 | 5.2 |
| Test Ex. 12 | 3:1 | 250 | 5.5 | 4.50 | 0.03 | 97.35 | 0.17 | 2.18 |
| Test Ex. 13 | 3:0.75 | 250 | 4.5 | 10.49 | 0.000 | 96.931 | — | 5.1 |
| Test Ex. 14 | 3:0.5 | 250 | 3 | 46.97 | 0.000 | 76.535 | — | 22.8 |

As shown in Table 3 for the tests of molar ratios (mixing ratios) of fatty acid and glycerin, the acid value was decreased to less than 50 mgKOH/g in all of the conditions of Test Examples 10 to 14 and particularly to 30 mgKOH/g or less in Test Examples 10 to 13 where a molar ratio (mixing ratio) of fatty acid to glycerin was set to be 3:0.75-2. For Test Examples 10 to 12, the final products were observed to contain trace amounts of glycerin. A greater input of glycerin is more likely to reduce the acid value, but is more abundantly found in the final product, which needs an additional process of separating glycerin.

[TEST EXAMPLE 15] Comparison of Bio-Oil Production Between Continuous Column-Type Reactor and CSTR (Feed PAO)

Comparison was made of acid value and loss rate between the bio-oils produced by the continuous column-type reactor and the CSTR (Table 4, below). The loss rates of glyceride and fatty acid in Table 4 were calculated according to Equation 2, meaning the ratio of the amount of glyceride and fatty acid removed as vapor to the amount of bio-oil released from the lower part of the reactor.

$$\text{Loss rate of glyceride \& fatty acid} = \frac{\text{Amount of glyceride \& fatty acid removed as vapor}}{\text{Amount of Bio-oil released from lower part of reactor}} \times 100 \quad [\text{Equation 2}]$$

(1) Example: Use of Continuous Column-Type Reactor

The operation conditions for the batch reaction in Test Examples 1 to 14 were applied. Bio-oil was produced at a reaction temperature of 250° C. under an atmospheric condition. No catalysts were employed. The feedstock included the fatty acid feed PAO (acid value 139 mgKOH/g), crude glycerin (glycerin content 48% by weight). PAO was fed into the reactor while being heated whereas crude glycerin was fed into the reactor without heating.

Conditions were set forth as follows: Feed flow rate: PAO 13.6 g/min, CGL 1.8 g/min [FFA:Glycerin molar ratio=3:ca. 0.8], Prod flow rate: 14.0 g/min, and retention time in reactor: 4.5 hours. The vapor was removed from the upper part of the reactor. Physical properties of the bio-oil (glyceride) finally obtained are given in Table 4, below.

(2) Comparative Example: Use of CSTR

Bio-oil was produced at a reaction temperature of 250° C. under an atmospheric condition. No catalysts were employed. The feedstock included the fatty acid feed PAO (acid value 139 mgKOH/g), crude glycerin (CGL, glycerin content 48% by weight) at a molar ratio of 3:ca. 0.8. The mixed feedstock (PAO and CGL) was fed into the reactor while being heated.

Conditions were set forth as follows: Feed flow rate (PAO and CGL in mixture): 9.5 g/min, Prod flow rate: 8.6 g/min, and retention time in reactor: 2 hours. The vapor was removed from the upper part of the reactor. Physical properties of the bio-oil (glyceride) finally obtained are given in Table 4, below.

(3) Results

TABLE 4

| | Example (Column-type reactor) | C. Example (CSTR) |
|---|---|---|
| Acid Value [mgKOH/g] | 22 (Retention time 4.5 hr) | 46.5 (Retention time 2 hr) |
| | 34.6 (Retention time 2.25 hr) | — |
| Loss rate of glyceride & fatty acid (wt %) | 0.2~0.25 | 2.82 |

Figure 5:
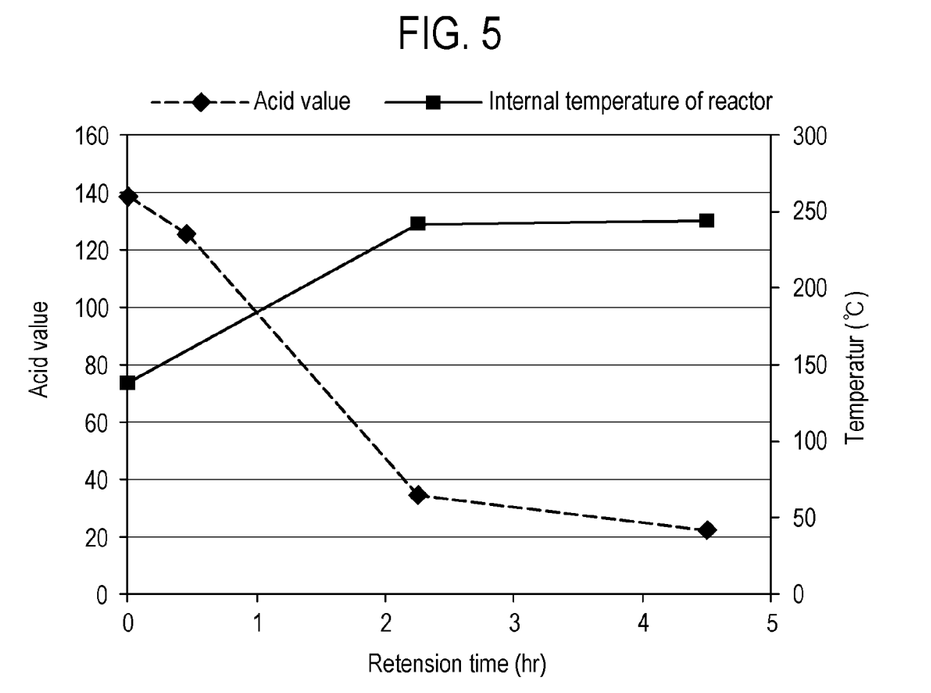
FIG. 5 is a plot of acid values according to internal temperatures and retention times in the reactor according to the Example of the present disclosure.

FIG. 5 is a plot of acid values according to internal temperatures and retention times in the reactor of the Example. In the reaction zone inside the column-type reactor used in the Example, the temperature was maintained at 140 to 243° C. in the upper to the mid region and at 245° C. in the mid to the lower region. As depicted in FIG. 5, the bio-oil (glyceride) specimen sampled from the mid region of the reaction zone at a retention time of 2.25 hours in the column-type reactor (Example) was measured to have an acid value of 34.6 mgKOH/g, which is close to the target acid value 30 mgKOH/g in spite of the section colder than the reaction temperature 250° C. The acid value was lower than 46.5 mgKOH/g, which was the acid value measured at a retention time of 2 hours in the CSTR (Comparative Example) (reaction temperature 250° C. maintained for the retention time). In addition, the acid value reached 30 mgKOH/g or less at a retention time of 4.5 hours in the column-type reactor (Example). The reaction results of the column-type reactor (Example) in lower temperature conditions was similar or better than those of CSTR (Comparative Example) in higher temperature conditions, indicating that the column-type reactor (Example) is better in reaction efficiency.

[TEST EXAMPLE 16] Production of Bio-Oil by Continuous Column-Type Reactor (Feed PFAD)

Bio-heavy oil was produced at 250° C. in a catalyst-free, atmospheric condition by feeding PFAD and crude glycerin sequentially into a column-type reactor. The feeds PFAD (acid value 189 mgKOH/g; ultrahigh acid value oil) and crude glycerin (glycerin content 36%) were used at a molar ratio of 3:0.9 of fatty acid (FFA):glycerin, with feeding rates of 12.8 g/min for PFAD and 3.3 g/min for crude glycerin. PFAD was fed into the reactor while being heated whereas the crude glycerin was fed into the reactor without heating.

The reaction product water and the water contained in crude glycerin were removed as vapor in the upper part of the reactor while the bio-oil (glyceride) and unreacted glycerin and fatty acid were released at a rate of 13.3 g/min from the lower part of the reactor. The retention time was about 5 hours.

The bio-oil produced at a retention time of 5 hours had an acid value of 26.2 mgKOH/g, demonstrating that the continuous column-type reactor of the present disclosure can produce bio-oil with an acid value of 30 mgKOH/g or less even when feeds with ultrahigh acid values (high content of fatty acids) are used.

Although the technical scope of the present disclosure has been described by the examples described in some embodiments and illustrated in the accompanying drawings, it should be noted that various substitutions, modifications, and changes can be made without departing from the scope of the present disclosure which can be understood by those skilled in the art to which the present disclosure pertains. In addition, it should be noted that that such substitutions, modifications, and changes are intended to fall within the scope of the appended claims.

What is claimed is:

1. A method for producing bio-oil, the method comprising the steps of:
   esterifying a feedstock containing glycerin and fatty acid to afford bio-oil and water in a column-type reactor which has a plurality of trays installed therein to form a plurality of compartments in the vertical direction inside the reactor, the plurality of trays each having an opening formed therein through which vertically adjacent compartments communicate with each other, with the openings in adjacent trays alternately formed in a crisscrossing manner, the feedstock containing glycerin and fatty acid being fed through respective material input ports located at a center of the column-type reactor to conduct the esterification in each tray of a reaction zone;
   obtaining the produced bio-oil through a lower part of the reactor; and
   removing the water produced through the esterification by vaporizing the water, moving the resulting water vapor to a distillation zone in an upper part of the reactor, along with effective ingredients including the feedstock and the bio-oil which are converted into vapor upon the vaporization, separating the vapor into water and the effective ingredients including feedstock and bio-oil on each tray in the distillation zone, and allowing the effective ingredients to flow into the reaction zone and the separated water from the vapor to be removed in a vapor state through the upper part of the reactor,
   wherein the bio-oil has an acid value of 30 mgKOH/g or lower, and the esterification reaction is performed at a reaction temperature of 170 to 350° C. under atmospheric pressure without using a catalyst.

2. The method of claim 1, wherein the water passes through a vapor path formed in each tray and separated and removed in the distillation zone of the upper part in the column-type reactor.

3. The method of claim 2, wherein a plurality of the vapor paths formed in each tray is selected from the group consisting of bubble caps, valves, and holes.

4. The method of claim 1, wherein the lower part of the column-type reactor is a reaction zone in which the glycerin is esterified with the fatty acid to afford glyceride as a product and the upper part of the column-type reactor is a distillation zone in which water as a byproduct of the esterification is vaporized and removed in a vapor state.

5. The method of claim 4, wherein the glycerin and the fatty acid remain for a retention time of 2 hours or longer in the reaction zone.

6. The method of claim 1, wherein the fatty acid and the glycerin are used at a mixing ratio (molar ratio) of 3:0.5 to 3:2.

7. The method of claim 1, wherein the feedstock including the fatty acid has an acid value of more than 30 mgKOH/g.

8. The method of claim 1, wherein the esterification is carried out at a reaction temperature of 170 to 350° C.

9. The method of claim 1, wherein the bio-oil as a reaction product has an acid value of 25 mgKOH/g or less.

10. The method of claim 1, wherein the glycerin has a glycerin concentration of 3 to 100% by mass.

11. The method of claim 1, wherein the water and the effective ingredients including the feedstock and the bio-oil are separated by boiling point.

12. The method of claim 7, wherein the feedstock including the fatty acid is selected from the group consisting of: a fatty acid oil prepared from a soap stock, which is a soap substance generated upon removal of free fatty acid during a process of purifying vegetable oil; products or byproducts generated in a process for animal and vegetable fat and oil or for oleochemicals, which are chemicals derived from the animal and vegetable fat and oil; fatty acid-containing oil generated as a result of oil expression and purification of vegetable/animal oils and fats; recoverable oil including waste cooking oil and brown grease; and a combination thereof.

13. The method of claim 1, wherein the reaction is carried out for a reaction time of 2 hours or longer.

* * * * *